H. H. THAYER & W. H. HART, Jr.,

Said THAYER assignor to J. H. HOFFMAN.

Fabric for Cuffs.

No. 9,547. Reissued Feb. 1, 1881.

Witnesses.
Robt Everett
E. A. Dick

Inventors.
H. H. Thayer & W. H. Hart jr.
by M. Bailey
Attorney.

N. PETERS, PHOTO-LITHOGRAPHER, WASHINGTON, D. C.

UNITED STATES PATENT OFFICE.

HIRAM H. THAYER, OF NEW YORK, N. Y., AND WILLIAM H. HART, JR., OF PHILADELPHIA, PENNSYLVANIA; SAID THAYER ASSIGNOR TO JAMES H. HOFFMAN, OF NEW YORK, N. Y.

FABRIC FOR CUFFS.

SPECIFICATION forming part of Reissued Letters Patent No. 9,547, dated February 1, 1881.

Original No. 114,490, dated May 2, 1871. Application for reissue filed November 20, 1880.

*To all whom it may concern:*

Be it known that we, HIRAM HOWARD THAYER, of the city, county, and State of New York, and WILLIAM HENRY HART, Jr., of Philadelphia, county of Philadelphia, State of Pennsylvania, have invented an Improved Cuff, of which the following is a specification.

Our invention consists of a fabric from which to manufacture cuffs, composed of a strip of material having its longer edges folded and cemented to the body of the strip in such manner that the folded edges of the said material or fabric form the longer edges of the cuff cut therefrom, as hereinafter described.

It also consists of a cuff made of a sheet of combined paper and cloth having longer edges, which are folded and cemented, cloth face outermost, to the body of the cuff, as hereinafter described.

Figure 1:
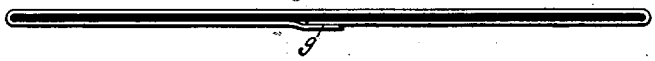
Figure 2:
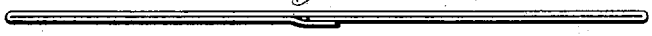
Figure 3:
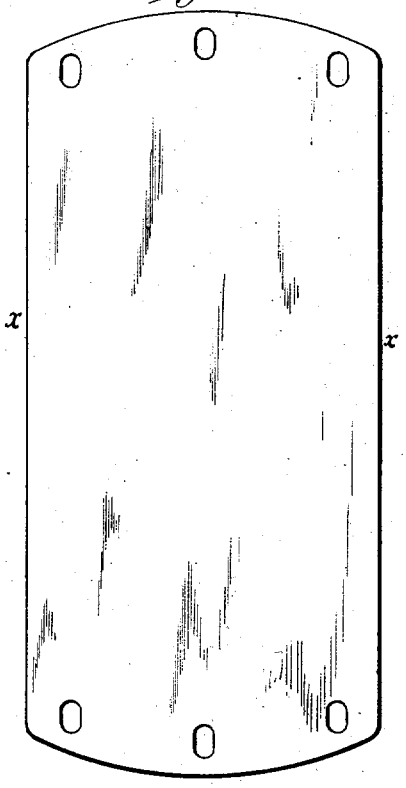
Figure 4:
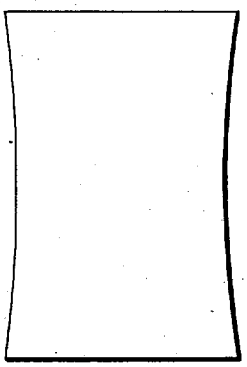
Figure 5:
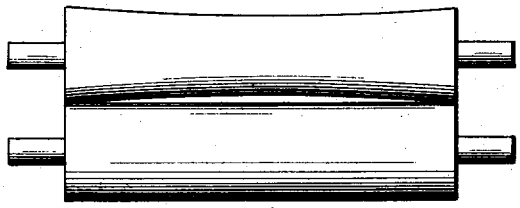

In the accompanying drawings, Figure 1 is a transverse section of a strip of material from which the cuffs are cut; Fig. 2, a modification; Fig. 3, a plan view of the cuff; Fig. 4, a view of the cuff as it appears when buttoned, and Fig. 5 a device for imparting the required flaring shape to the cuff.

Our improved cuff is in all cases made with parallel edges *x x*, Fig. 3, and the cuffs are cut from a strip consisting of paper or textile fabric, or of a compound fabric formed into a tube and flattened, the strip thus made being of such a width that the folded edges of the same will form the edges *z z* of the cuffs cut therefrom. In making this strip a sheet of paper and textile fabric cemented together, or of textile fabric upon the surface of which paper pulp is compressed, may be folded, as shown in Fig. 1, the edges overlapping at *g*, and cement being applied to the adjacent surfaces, so as to unite the whole. While obtaining the best results, on the whole, from folding the strip to the extent indicated, yet it is not necessary that the folds should overlap, as shown, all that is required being that the edges shall be folded and cemented, cloth side outermost, to the body of the compound fabric in such manner that the fabric shall have cloth-covered, folded, and cemented edges, which form the longer edges of the cuff cut therefrom.

Instead of a compound fabric, paper or textile fabric alone may be used, a strip of the same being folded into a tube, compressed, and cemented, as shown in Fig. 2. Lighter and more flexible cuffs may be made from this strip than from the compound fabric; but the same advantage of avoiding cut edges, which will become frayed, is obtained.

By passing the cuffs, before the cement is quite dry, longitudinally between rollers (of the form shown in Fig. 5) the cuffs may be extended at the edges, thus imparting to them the flaring shape hitherto obtained by making each cuff of two curved pieces secured together along the center of the cuff.

Cuffs may be made of tubular textile fabric formed in a loom or knitting-machine, and, if desired, a strip of paper may be inserted and cemented in the said tube to stiffen the same.

We claim—

1. A fabric from which to manufacture cuffs, consisting of a tubular material flattened and cemented so that the folded edges of the fabric form the side edges of the cuff cut therefrom, substantially as described.

2. A combined paper and cloth cuff having its longer edges folded and cemented, cloth face outermost, to the body of the cuff, substantially as hereinbefore set forth.

In testimony whereof we have hereunto set our hands the 13th and 15th days of November, 1880.

H. H. THAYER.
W. H. HART, JR.

Witnesses as to H. H. Thayer:
S. VAN ZANDT,
JAS. H. HOFFMAN.

Witnesses as to W. H. Hart, Jr.:
ALBERT B. GUILBERT,
HENRY O. MASSEY.